W. J. HATHEWAY.
GRASS SEED HARVESTER.
APPLICATION FILED MAY 21, 1915.
1,212,053.
Patented Jan. 9, 1917.
2 SHEETS—SHEET 1.
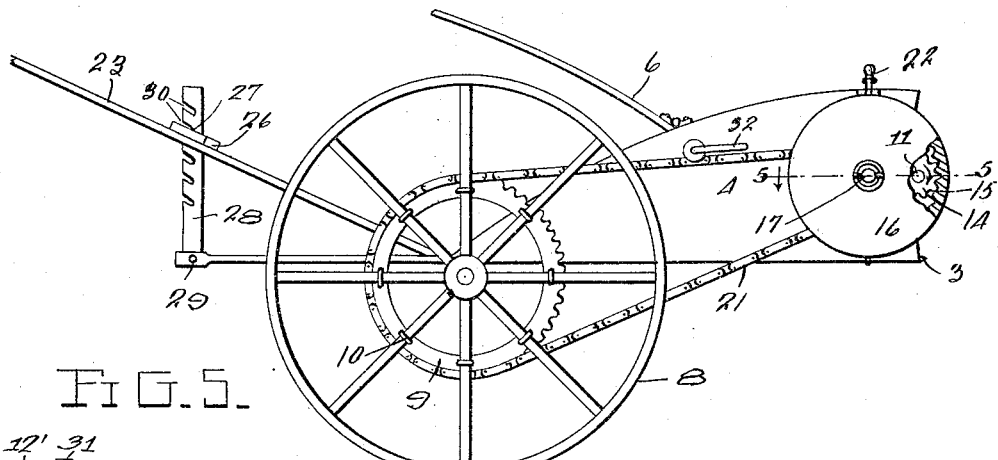
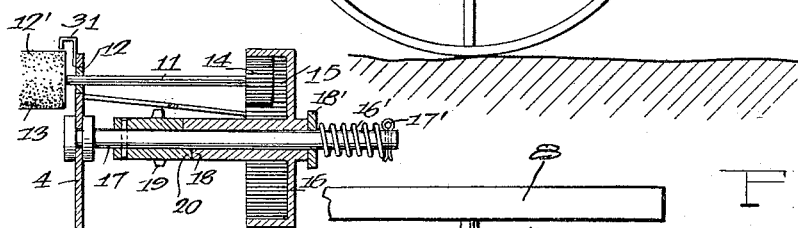
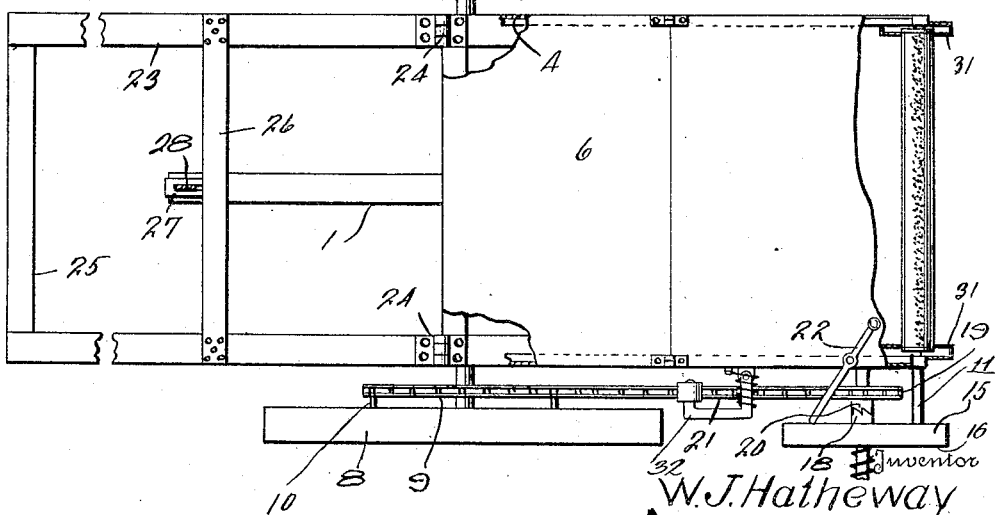
Witnesses
Chas. H. Trotter
J. W. Garner
Inventor
W. J. Hatheway
By [signature], Attorney W. J. HATHEWAY.
GRASS SEED HARVESTER.
APPLICATION FILED MAY 21, 1915.
1,212,053.
Patented Jan. 9, 1917.
2 SHEETS—SHEET 2.
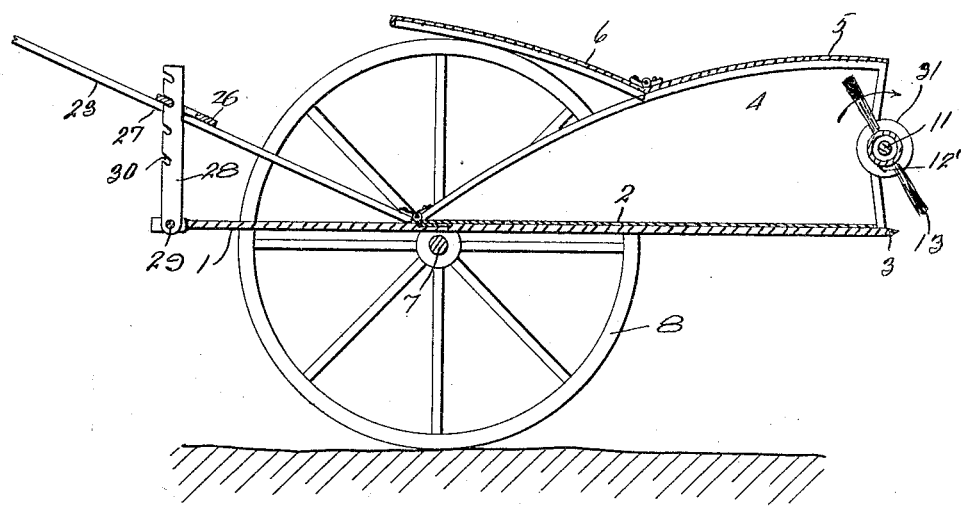
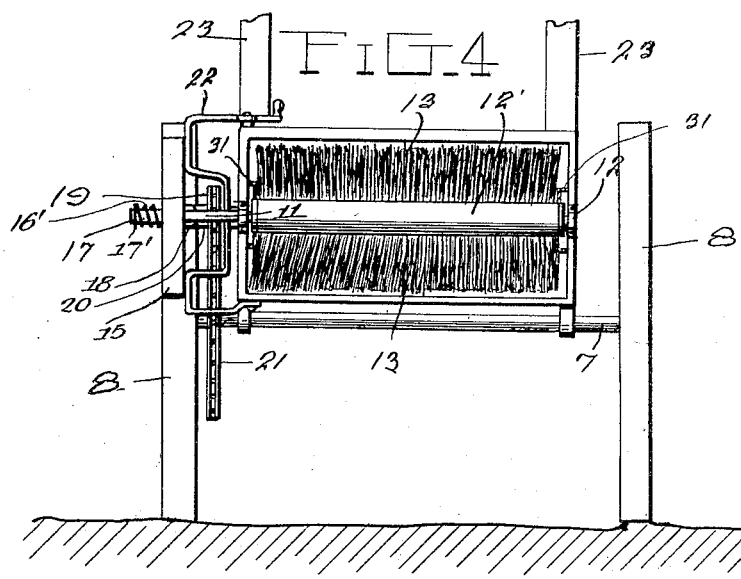

UNITED STATES PATENT OFFICE.

WOODSON J. HATHEWAY, OF STANBERRY, MISSOURI.

GRASS-SEED HARVESTER.

1,212,053.   Specification of Letters Patent.   Patented Jan. 9, 1917.

Application filed May 21, 1915. Serial No. 29,557.

*To all whom it may concern:*

Be it known that I, WOODSON J. HATHE-WAY, a citizen of the United States, residing at Stanberry, in the county of Gentry and State of Missouri, have invented certain new and useful Improvements in Grass-Seed Harvesters; and I do hereby declare the following to be a full, clear, and exact description of the invention, such as will enable others skilled in the art to which it appertains to make and use the same.

This invention is an improved header or grass seed harvester especially adapted for use and for operation by one man, for harvesting the seeds of blue grass, but also adapted for other analogous uses, the object of the invention being to provide an improved machine of this kind which is cheap and simple in construction, is light so that it may be readily propelled and operated by one man and which may be held in any desired adjusted position, according to the height of the grass or other crop.

The invention consists in the construction, combination and arrangement of devices hereinafter described and claimed.

Figure 1 is a side elevation partly in section of a seed header or harvester constructed in accordance with my invention. Fig. 2 is a plan view of the same partly in section. Fig. 3 is a vertical longitudinal sectional view of the same. Fig. 4 is a front elevation of the same. Fig. 5 is a sectional view of the gearing taken on the line 5—5 of Fig. 1, looking in the direction of the arrow.

In accordance with my invention I provide a frame 1 on which is stretched and secured a canvas bottom 2. At the front end of the said frame and extending across the same is a grass rail or ledger bar 3. The front portion of the frame 1 is provided with vertical segmental side walls 4, which present arcuate edges and on the upper sides of said walls and stretched between them is a canvas cover 5, which includes a hinged lid or door 6, said hinged lid or door being arranged at the rear side of the seed-receiving box formed by the bottom, top and side walls. The said frame 1 is mounted at a point intermediate its ends on an axle 7, which is provided with ground wheels 8. A sprocket wheel 9 is secured to the inner side of one of the wheels 8, as at 10. A shaft 11 is arranged transversely across the front side of the box and mounted in bearings 12 which are midway or substantially so between the upper and lower sides of the box and on the said shaft is arranged a brushing and beating cylinder 12', which has radially arranged brushing and beating fingers 13 which may be made of any suitable material. On one end of the shaft 11 is a spur gear 14, which engages an internally toothed gear wheel 15, which has an outer cover 16 and serves to protect said gear 14.

The gear 15 is mounted for rotation and longitudinal movement on a stub shaft 17 which is journaled in one of the side walls 4 and the gear 15 is provided with a clutch element 18 on its inner side. A sprocket wheel 19 is keyed to the stub shaft 17 and is provided on its outer side with a clutch element 20 which is engaged by the clutch element 18 which is normally urged in the direction of the sprocket wheel by a coil spring 16' mounted upon the outer end of the stub shaft and interposed between a cotter pin 17' and a collar 18' which bears against the cover 16 of the gear 15, whereby upon rotation of the sprocket wheel, the gear 15 will be rotated, driving the beating cylinder 12'. The sprocket wheel 19 is connected to the sprocket wheel 9 by a chain 21, whereby upon pushing the machine forwardly, the wheels 8 will drive the sprocket wheel 19, which in turn drives the gear 15 through the clutch elements 20 and 18, when engaged with each other. The gear 15 being driven will rotate the cylinder 12' in the direction indicated by the arrow in Fig. 3, so as to cause the heads of grass, or other plants, to be caught by the revolving cylinder and in co-action with the ledger bar 3 be cut and broken from the plants and swept rearwardly into the box and be caused to collect therein.

To unclutch the gear 15 from the sprocket wheel 19 I provide a suitable shifter 22, as shown.

A pair of push arms 23 have their front ends connected to the frame 1 at a point coincident with the rear side of the box, by hinges 24, which admit of any desired angular adjustment of said push arms with the bottom of the box so that the front end of the box, with its heading mechanism, may be held operative at any desired adjustment. A suitable push bar 25 connects the rear ends of the push arms and the said push arms are also connected together at a point intermediate their ends by means of a cross bar 26. Said cross bar has a rearwardly extending guide 27. An adjusting link 28 is arranged for vertical movement in the guide 27, has its lower end pivotally connected, as at 29, to the rear end of the frame 1 and is provided on its rear side with a series of adjusting notches 30, any one of which may be engaged with the rear side of the guide 27 to lock the push arms 23 at any desired angular adjustment with respect to the said frame 1.

While the machine is being pushed to harvest the seeds of grass or other plants the lid 6 will be kept closed. To discharge the contents of the box it is only necessary to raise the lid and tilt the box rearwardly so as to lower its rear end and the rear end of the frame 1 and thereby discharge the seeds from the box by gravity, as will be understood.

Grass shields 31 are attached to the walls 4 to cover the ends of the cylinder 12 and avoid friction at the shaft. A chain belt tightener 32 is also provided which is attached to the frame 1 adapted to bear upon the chain belt 21 so that said chain belt 21 will be kept free from any slack that may occur during the operation of the device.

What is claimed is:

1. A harvester of the class described comprising a frame, a box at the front end of the frame, a header mechanism at the front end of the box and including a revoluble element provided with a spur gear, an axle on which the frame is mounted, ground wheels on the axle, a sprocket wheel attached to one of the ground wheels, a stub shaft extending from one side of the box, an internally toothed gear mounted on said stub shaft and engaged with said spur gear, a second sprocket wheel also on the stub shaft to rotate the internally toothed gear, and an endless sprocket chain connecting said sprocket wheels, the said second sprocket wheel being mounted for movement toward and from said internally toothed gear, said sprocket wheel and said internally toothed gear being provided with clutch elements to connect them together, a spring to normally hold said sprocket wheel and internally toothed gear in clutched relation, and a shifter to unclutch said sprocket wheel from said internally toothed gear.

2. A harvester of the class described comprising a frame, an axle on which the frame is mounted, ground wheels on the axle, a box on the front portion of the frame, a header mechanism at the front end of the box, push rods hingedly secured to the ends of said frame and adjacent the ground wheels, a push bar connecting the free ends of the push rods together, a cross rod secured to the push rods intermediate their ends thereof, a rearwardly extending guide formed on the cross bars intermediate its ends and provided with an elongated slot therein, an adjusting link pivotally secured to the rear end of the frame and provided with notches therein adapted to engage the elongated slots of the rearwardly extending guides for the purpose of securing the push rods in any desired position in relation to the frame.

3. A harvester of the class described comprising a frame, a pair of walls formed on said frame, a bottom secured to said frame between the walls, a cover secured to the upper edges of the walls, a door hinged to the cover providing means for removing seed from the closure formed, ground wheels mounted upon the frame, a header mechanism secured transversely of the front ends of the walls, push arms pivoted to the frame and extending rearwardly therefrom, and means for rotating the header mechanism.

In testimony whereof I affix my signature in presence of two witnesses.

WOODSON J. HATHEWAY.

Witnesses:
WILLIAM H. KARR,
DAVID C. THOMAS.

Copies of this patent may be obtained for five cents each, by addressing the "Commissioner of Patents, Washington, D. C."